US012437277B2

(12) United States Patent
Arinze

(10) Patent No.: US 12,437,277 B2
(45) Date of Patent: Oct. 7, 2025

(54) SYSTEMS AND METHODS FOR FUNDS TRANSFER ACCOUNT AGGREGATOR

(71) Applicant: KAOSHI INC., Chicago, IL (US)

(72) Inventor: Chukwunonso Arinze, Chicago, IL (US)

( * ) Notice: Subject to any disclaimer, the term of this patent is extended or adjusted under 35 U.S.C. 154(b) by 74 days.

(21) Appl. No.: 18/277,971

(22) PCT Filed: Feb. 19, 2021

(86) PCT No.: PCT/US2021/018874
§ 371 (c)(1),
(2) Date: Aug. 18, 2023

(87) PCT Pub. No.: WO2022/177574
PCT Pub. Date: Aug. 25, 2022

(65) Prior Publication Data
US 2024/0152886 A1    May 9, 2024

(51) Int. Cl.
G06Q 10/107    (2023.01)
G06Q 20/10     (2012.01)
G06Q 40/02     (2023.01)

(52) U.S. Cl.
CPC .......... G06Q 20/10 (2013.01); G06Q 10/107 (2013.01); G06Q 40/02 (2013.01)

(58) Field of Classification Search
CPC ...... G06Q 20/10; G06Q 10/107; G06Q 40/02; G06Q 20/02; G06Q 20/227; G06Q 20/32; G06Q 20/3821; G06Q 20/40145; G06Q 30/0207; G06Q 30/0251; G06Q 30/0282; G06Q 30/0283; G06Q 10/10

USPC .......................................................... 705/39
See application file for complete search history.

(56) References Cited

U.S. PATENT DOCUMENTS 6,246,996 B1    6/2001  Stein et al.
8,620,790 B2 * 12/2013  Priebatsch ........... G06Q 20/322
                                                     705/35
11,012,491 B1 * 5/2021  Kapczynski ........... G06Q 30/02
(Continued)

OTHER PUBLICATIONS

Barasch, "Account Aggregation Software: What it Is and How to Choose It," Yodlee, retrieved from https://www.yodlee.com/data-aggregation/account-aggregation-software-what-it-and-how-choose-it, 6 pages (2018).

(Continued)

Primary Examiner — Clifford B Madamba
(74) Attorney, Agent, or Firm — Foley & Lardner LLP

(57) ABSTRACT

Systems and methods for a computing system for facilitating financial transactions are provided. The system is structured to aggregate user data including sender data and recipient data, and to facilitate creating and aggregating user accounts at multiple financial institutions. The system includes an account management circuit structured to generate a user account, an executable structured to determine whether a user browser has navigated to a first hyperlink, and a transaction circuit structured to facilitate a transaction. Specifically, the transaction circuit is structured to receive an indication that the user browser has accessed the first hyperlink, determine whether a first financial institution account exists, facilitate a financial transaction, and generate a notification including a confirmation that the transaction was completed.

20 Claims, 7 Drawing Sheets

(56) References Cited

U.S. PATENT DOCUMENTS

| | | | | |
|---|---|---|---|---|
| 2003/0204460 | A1* | 10/2003 | Robinson | G07F 7/1016 |
| | | | | 705/35 |
| 2007/0130065 | A1 | 6/2007 | Staab et al. | |
| 2009/0307133 | A1 | 12/2009 | Holloway et al. | |
| 2015/0026024 | A1* | 1/2015 | Calman | G06Q 40/02 |
| | | | | 705/35 |
| 2015/0350211 | A1* | 12/2015 | Burgess | H04L 63/10 |
| | | | | 726/30 |
| 2017/0352014 | A1* | 12/2017 | Smith | G06Q 20/108 |

OTHER PUBLICATIONS

International Search Report & Written Opinion for PCT/US2021/018874 dated May 5, 2021, 11 pages.

Investopedia, "Open Banking," retrieved from https://www.investopedia.com/terms/o/open-banking.asp, 8 pages (2020).

* cited by examiner

SYSTEMS AND METHODS FOR FUNDS TRANSFER ACCOUNT AGGREGATOR

CROSS-REFERENCE TO RELATED PATENT APPLICATIONS

This application is the U.S. national phase of PCT Application No. PCT/US2021/018874, filed Feb. 19, 2021, the entire contents of which is incorporated herein by reference.

TECHNICAL FIELD

The present disclosure relates to systems and methods for funds transfer account aggregator.

BACKGROUND

Financial institutions such as banks, credit unions, and the like, may provide funds transfer services. The funds transfer services may include transactions such as sending money to a recipient, sending money to a recipient in a different currency, sending money to a recipient in a different country, making a payment, and the like. The financial institutions may charge a fee for each of these transactions. The fee may change frequently and/or be based on a recipient location, time of day, and other parameters. Accordingly, it may be desirable to use the services of the lowest cost financial institution.

SUMMARY

At least one arrangement relates to an account aggregator system structured to facilitate financial transactions. The system includes an account management circuit, a user account vault, an executable and a transaction circuit. The account management circuit is structured to generate a user account. The user account is associated with the user and includes an e-mail circuit. The user account vault is structured to retrievably store user data associated with the user and receiver data associated with a receiver. The executable is structured to be provided to a user computing system via the network. The executable is structured to determine whether a user browser is open on the user computing system and whether the user browser is navigated to a first hyperlink. The first hyperlink is associated with a first webpage of a first financial institution of a plurality of financial institutions. The executable is also structured to intercept a user input provided by the user to the user browser. The transaction circuit structured to receive a first indication that the user browser is navigated to the first hyperlink. The transaction circuit is also structured to determine whether a first financial institution account associated with the first financial institution and at least one of the e-mail circuit and the user exists in the user account vault based on the user input via the first hyperlink. The transaction circuit is also structured to facilitate the financial transaction at the first financial institution in response to determining that the first financial institution account exists. The transaction circuit is also structured to receive a confirmation that the transaction is completed from an e-mail form the first financial institution and via the e-mail circuit. The transaction circuit is also structured to generate a first notification including the confirmation and provide the first notification to the user computing system.

In some arrangements, the transaction circuit is further structured to receive the user input via the executable. The transaction circuit is also structured to determine whether the user input comprises recipient data. The recipient data is associated with a recipient of funds. The transaction circuit is also structured to determine, responsive to determining that the user input comprises the recipient data, whether the recipient data is stored in the user account vault. The transaction circuit is also structured to retrievably store, responsive to determining that the recipient data is not stored in the user account vault, the recipient data in the user account vault.

In some arrangements, the user data comprises at least one of a user name, a user address, a user account identifier, and a user e-mail. In some arrangements, the recipient data comprises at least one of a recipient name, a recipient address, and a recipient account identifier.

In some arrangements, facilitating the financial transaction by the transaction circuit includes providing a second hyperlink to the user computing system. The second hyperlink is associated with a second webpage of the first financial institution. The second webpage includes a plurality of text fields. Each of the plurality of text fields is structured to receive at least one the user data and the recipient data. The executable is structured to generate a first prompt for the user. The first prompt includes a request to automatically populate the text fields. The executable is also structured to provide the first prompt to the user computing system. The executable is also structured to automatically populate, responsive to receiving a response to the first prompt to automatically populate the text fields, each of the plurality of text fields based on the user data and the recipient data. The executable is also structured to automatically determine, responsive to receiving a response to the first prompt to not automatically populate the text fields and based on the user input and at least one of the user data and the recipient data, whether the user input includes an error. The executable is also structured to generate a flag indicating that the user input includes an error. The executable is also structured to provide the flag to the user computing system. The flag includes a second prompt to automatically correct the error.

In some arrangements, facilitating the financial transaction by the transaction circuit includes accessing a third hyperlink. The third hyperlink is associated with a third webpage of the first financial institution. The third webpage includes a plurality of text fields. Each of the plurality of text fields is structured to receive at least one the user data and the recipient data. Facilitating the financial transaction by the transaction circuit also includes automatically populating each of the plurality of text fields with at least one of the user data and the recipient data.

In some arrangements, the executable is structured as at least one of a browser plug-in structured to be provided to the user browser of the user computing system and a mobile application.

In some arrangements, wherein the e-mail circuit is further structured to retrieve e-mail data from an e-mail received by the e-mail circuit. The e-mail data includes at least one of a hyperlink, a price, a coupon, transaction data, recipient data, and financial data from at least one of the plurality of financial institutions. The e-mail circuit is also structured to generate, based on the e-mail data, a financial profile of the user. The financial profile of the user includes at least part of the e-mail data. The e-mail circuit is also structured to determine, based on the e-mail data, a status of the transaction, the status comprising at least one of when the transaction has been initiated, when the transaction is processing, when the transaction is cancelled, and when the transaction is completed. The e-mail circuit is also structured to generate a second notification indicating the status of the transaction. The e-mail circuit is also structured to provide the second notification to the user computing system.

In some arrangements, the transaction circuit is further structured to retrieve financial institution data from at least one of the plurality of financial institutions. The financial institution data includes a plurality of prices. Each of the plurality of prices is associated with one of the plurality of financial institutions. The system also includes at least one of a screen scraping circuit and an aggregator application programming interface (API) circuit. The screen scraping circuit is structured to access the first hyperlink and retrieve a first portion of the plurality of prices. The first portion includes webpage prices from the first webpage. The aggregator API circuit is structured to access a financial institution API and retrieve a second portion of the plurality of prices. The second portion includes API prices from the financial institution API. The e-mail circuit is further structured to retrieve a third portion of the plurality of prices. The third portion includes e-mail prices received via a first financial institution e-mail. The e-mail circuit is also structured to retrieve a coupon from a second financial institution e-mail. The e-mail circuit is also structured to determine a fourth portion of the plurality of prices, the fourth portion comprising calculated prices determined by modifying at least one of the webpage prices, the API prices, and the e-mail prices with the coupon. The transaction circuit is structured to determine, based on the financial institution data, a lowest price of the plurality of prices, the lowest price associated with at least one of the plurality of financial institutions.

In some arrangements, the computer system structured is further structured to generate, by the account management circuit and responsive to determining that the first financial institution account does not exist, a first prompt including a request to create the first financial institution account. The computer system is also structured to provide, by the account management circuit, the first prompt to the user computing system via the executable. The computer system is also structured to receive, by the account management circuit, a first prompt response, the first prompt response comprising an indication to create the first financial institution account. The computer system is also structured to generate a third hyperlink. The third hyperlink is associated with a third webpage of the first financial institution, the third webpage comprising a plurality of text fields. At least one of the plurality of text fields is structured to receive at least one of a user email and a user password.

In some arrangements, the account management circuit comprises a zero-knowledge encryption circuit. The zero-knowledge encryption circuit is structured to automatically generate a first password associated with the first financial institution. The zero-knowledge encryption circuit is also structured to associate the first password with a first username. The zero-knowledge encryption circuit is also structured to retrievably store the first password and the first username in the user account vault. The zero-knowledge encryption circuit is also structured to access the third hyperlink. The zero-knowledge encryption circuit is also structured to selectively provide the first password and the first username via the third webpage. The first password is not known to a service provider associated with the aggregator computing system.

In some arrangements, the account management circuit is further structured to provide the third hyperlink to the user computing system via the executable. The executable is further structured to automatically populate each of the plurality of text fields based on at least one of the first username and the first password.

In some arrangements, the account management circuit is further structured to access the third hyperlink. The account management circuit is also structured to automatically populate each of the plurality of text fields based on at least one of an e-mail address, the first username, and the first password. The account management circuit is also structured to receive, via the e-mail circuit, an account confirmation hyperlink. The account management circuit is also structured to automatically access the account confirmation hyperlink to confirm the first financial institution account.

Another arrangement relates to a method of facilitating financial transactions. The method includes generating, by an account management circuit, a user account. The user account is associated with a user and includes user financial data, receiver financial data, and an e-mail address. The e-mail address is associated with an email circuit. The method also includes retrievably storing, by the account management circuit, the user account in a user account vault. The method also includes retrieving, by a transaction circuit, a plurality of prices. Each of the plurality of prices is associated with one of a plurality of financial institutions. The method also includes determining, by the transaction circuit, a lowest price of the plurality of prices. The lowest prices is associated with a first financial institution of the plurality of financial institutions. The method also includes receiving, from a user computing system, a request to facilitate a financial transaction. The method also includes accessing, by the transaction circuit, a first hyperlink, the first hyperlink associated with a transaction webpage of the first financial institution. The method also includes determining, by the transaction circuit, whether a first financial institution account associated with the first financial institution and at least one of the e-mail circuit and the user exists in the user account vault. The method also includes accessing, by the account management circuit and responsive to determining that the first financial institution account exists, the first financial institution account. The method also includes automatically providing, by an executable, at least one of the user financial data and the recipient financial data on the first transaction webpage. The method also includes facilitating, by the executable, the financial transaction via the transaction webpage. The method also includes receiving, by the e-mail circuit, a first email from the first financial institution including a transaction confirmation. The method also includes generating, by the transaction circuit, a notification including the transaction confirmation. The method also includes providing, by the transaction circuit, the notification to the user computing system.

In some arrangements, accessing the first hyperlink by at least one of the transaction circuit and the user computing system includes determining, by the executable, whether a user browser is open on the user computing system. Accessing the first hyperlink also includes determining, by the executable, whether the user browser is navigated to the first hyperlink. Accessing the first hyperlink also includes intercepting, by the executable, a user input provided by the user to the user browser. Accessing the first hyperlink also includes receiving, by the transaction circuit, the user input. Accessing the first hyperlink also includes determining, by the transaction circuit, whether the user input comprises recipient data, the recipient data associated with a recipient of funds. Accessing the first hyperlink also includes determining, by the transaction circuit and responsive to determining that the user input comprises the recipient data, whether the recipient data is stored in the user account vault. Accessing the first hyperlink also includes retrievably storing, by the account management circuit and responsive to determining that the recipient data is not stored in the user account vault, the recipient data in the user account vault.

In some arrangements, the executable is at least one of a browser plug-in structured to be provided to the user browser of the user computing system and a mobile application structured to be installed on the user computing system.

In some arrangements, the method further includes automatically generating, by the account management circuit and responsive to determining that the first financial institution account does not exist, the first financial institution account. Automatically generating the first financial institution account includes accessing, by the account management circuit, a second hyperlink. The second hyperlink includes an account creation webpage associated with the first financial institution. The account creation webpage includes at least one of an e-mail input field and a password input field. Automatically generating the first financial institution account also includes automatically generating, by a zero-knowledge encryption circuit, a password. Automatically generating the first financial institution account also includes automatically populating, by the executable, the e-mail input field with the e-mail address and the password input field with the password. Automatically generating the first financial institution account also includes retrieving, by the e-mail circuit in real-time, a third hyperlink that, when accessed, is structured to provide an indication to the first financial institution that the first financial institution account is legitimate. Automatically generating the first financial institution account also includes automatically accessing, by the account management circuit, the third hyperlink such that the first financial institution account is verified by the first financial institution.

In some arrangements, the method further includes automatically updating the plurality of prices based on at least one of: webpage prices, API prices, e-mail prices, and calculated prices. The webpage prices are retrieved from a financial institution webpage utilizing a screen scraping circuit. The API prices are retrieved from a financial institution application programming interface (API) utilizing an aggregator API circuit. The e-mail prices retrieved from a financial institution e-mail advertisement by the e-mail circuit. The calculated prices are determined by modifying at least one of the webpage prices, the API prices, and the e-mail prices with a coupon retrieved from a financial institution e-mail by the e-mail circuit.

Another arrangement relates to a non-transitory computer readable medium having computer-executable instructions embodied therein that, when executed by at least one processor of a computing system, cause the computing system to perform operations to facilitate a financial transaction. The operation comprises generating a user account. The user account includes an e-mail address and user financial data. The operation further comprises retrieving a plurality of prices. Each of the plurality of prices is associated with one of a plurality of financial institutions. The operation further comprises determining a lowest price of the plurality of prices. The lowest price is associated with a first financial institution of the plurality of financial institutions. The operation further comprises receiving a request to facilitate a financial transaction at the first financial institution. The operation further comprises determining whether a user computing system has opened a web browser. The operation further comprises determining whether the web browser has accessed a first hyperlink. The first hyperlink is associated with a first webpage. The operation further comprises intercepting a user input provided by a user to the first webpage. The user input includes recipient financial data. The operation further comprises associating the recipient data with the user account. The operation further comprises determining whether a financial institution account that is associated with the user and the first financial institution exists. The operation further comprises accessing the first financial institution account responsive to determining that the first financial institution account exists. The operation further comprises automatically providing at least one of the user financial data and the recipient financial data to the first webpage. The operation further comprises facilitating the financial transaction via the first webpage. The operation further comprises receiving a first email from the first financial institution including a transaction confirmation. The operation further comprises generating a notification including the transaction confirmation. The operation further comprises providing the notification to the user computing system.

In some arrangements, the media includes at least one of a web browser extension structured to be provided to the web browser of the user computing system and an application structured to be installed on the user computing system.

In some arrangements, the operations further include at least one of an automatic repeated transaction operation and an automatic financial institution account generation operation. The automatic repeated transaction operation is structured to facilitate executing multiple transactions repeatedly. The automatic repeated transaction operation includes facilitating a plurality of financial transactions. The automatic repeated transaction operation also includes retrievably storing data associated with each of the plurality of financial transactions. The data includes at least one of a transaction amount, the receiver financial data, and the user financial data. The automatic repeated transaction operation also includes generating a prompt comprising a second request for automatic repeated transactions. The automatic repeated transaction operation also includes providing the prompt to the user computing system. The automatic repeated transaction operation also includes receiving a response indicating that the user wants automatic repeated transactions. The automatic repeated transaction operation also includes automatically facilitating automatic repeated transactions responsive to receiving the response. The automatic financial institution account generation operation is structured to automatically generate the financial institution account responsive to determining that the financial institution account does not exist. The automatic financial institution account generation operation includes accessing an account creation webpage associated with the first financial institution. The account creation webpage includes at least an e-mail input field and a password input field. The automatic financial institution account generation operation also includes automatically generating a password utilizing a zero-knowledge encryption circuit. The automatic financial institution account generation operation also includes automatically populating the e-mail input field with the e-mail address and the password input field with the password. The automatic financial institution account generation operation also includes retrieving in real-time an account verification hyperlink that, when accessed, is structured to provide an indication to the first financial institution that the financial institution account is legitimate. The automatic financial institution account generation operation also includes automatically accessing the account verification hyperlink such that the financial institution account is verified by the first financial institution.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
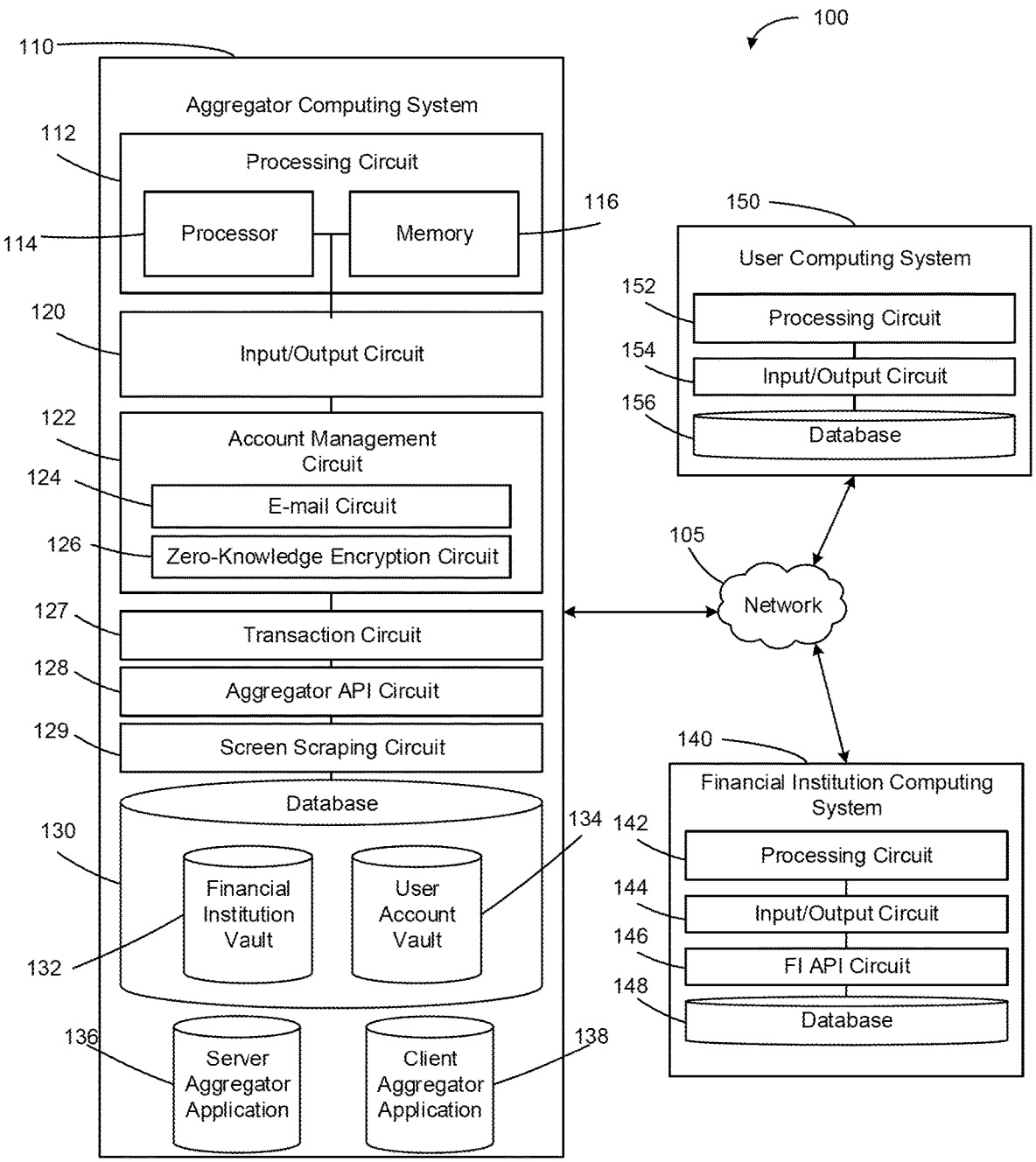
FIG. 1 is a component diagram of a system for aggregating funds transfer accounts, according to an example arrangement.

Referring generally to the figures, systems and methods for a funds transfer account aggregator are disclosed.

Conventionally, data aggregation services such as password services and other web-based applications are structured to only auto-fill some information on a webpage. For example, an auto-fill application may be structured to automatically provide a username, email, and/or password on a webpage only if the auto-fill application detects a text input field associated with the data stored by the auto-fill application. Many auto-fill applications will not automatically populate a text field if the application does not have the correct data or cannot identify the text field. Furthermore, auto-fill applications may make mistakes in automatically populating text fields if the application does not correctly identify the type of data required in a text field. When entering mistake-sensitive information (e.g., financial information for transaction recipients and the like) on an online platform, a user may not notice if an auto-fill application makes a mistake. The mistake may cause the user to execute an incorrect financial transaction. To solve this problem, the systems and methods described herein provide a technical improvement in the field of aggregating user data including sender data and recipient data and facilitating mistake-free financial transactions using the aggregated data by automatically providing only the correct data at a correct text input field when it is determined that a user has navigated to a particular hyperlink (i.e., in some arrangements, without waiting for the user to start entering data).

Further, the embodiments of the aggregator system as described herein improve data aggregation and financial transaction technology by performing certain steps that cannot be done by conventional systems or human actors. For example, the aggregator system may reduce the number of transmissions necessary to facilitate a mistake-free financial transaction. Specifically, the aggregator system may execute a financial transaction without having to provide a user access to one or more webpages of a financial institution where the transaction requests can be made. Rather, the aggregator system may be structured to access these webpages without displaying the webpages to a user.

In an example arrangement, the system is structured to facilitate executing financial transactions across multiple financial institutions. The system is structured to generate an aggregator user account and retrievably store user data and recipient data associated with the aggregator user account. The system is structured to provide an e-mail address that is associated with the aggregator user account. The system is structured to receive a request from a user to initiate a financial transaction. The system may determine a lowest cost financial institution with witch to execute the transaction. The system may then determine if the user has an account with the lowest cost financial institution. If the user does not have an account, the system may facilitate generating a new financial institution user account including automatically generating a username and a zero-knowledge encrypted password, and automatically providing user data to the financial institution to complete the account creation. Additionally, the system may be structured to verify the account creation by retrieving a verification token from the e-mail address and providing the verification token to the financial institution. The system may then facilitate the financial transaction at the financial institution. The system may automatically provide any user data or recipient data that is needed to complete the transaction. After submitting a transaction request to the financial institution, the system may retrieve a transaction confirmation from the e-mail and provide the confirmation to the user via a push notification, an e-mail, or a text message.

Before turning to the figures, which illustrate certain example arrangements in detail, it should be understood that the present disclosure is not limited to the details or methodology set forth in the description or illustrated in the figures. It should also be understood that the terminology used herein is for the purpose of description only and should not be regarded as limiting. For example, as used herein, the term "circuit" may include any combination of hardware and software. In some arrangements, all or some "circuit(s)" may include hardware structured to execute the functions described herein. In some arrangements, all or some "circuit (s)" may include machine-readable media for configuring the hardware to execute the functions described herein. For example, the machine-readable media may be structured to retrievably store software such as an application, an executable, a program, or other machine executable instructions.

FIG. 1 is a component diagram of a computing system 100 for aggregating funds transfer accounts, according to an example arrangement. In some arrangements, and as shown in FIG. 1, the computing system 100 includes an aggregator computing system 110, a financial institution (FI) computing system 140, and a user computing system 150. In some arrangements the aggregator computing system 110 is associated with a service provider such as a business, the FI computing system 140 is associated with a financial institution (e.g., a money transfer service), and the user computing system 150 is associated with a user such as a customer of the service provider. Each of the computing systems may include any of transitory storage media, non-transitory storage media, hardware- and/or software-based circuitry, memory, and processor(s) in a suitable combination.

Each of the computing systems of the computing system 100 is communicatively coupled to a network 105. Specifically, the aggregator computing system 110, the FI computing system 140, and the user computing system 150 are communicatively coupled to the network 105 such that the network 105 permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the aggregator computing system 110 and other computing systems not associated with the service provider such as additional FI computing systems and/or additional user computing systems. The network 105 may include one or more of a cellular network, the Internet, Wi-Fi, Wi-Max, a proprietary provider network, a proprietary retail or service provider network, and/or any other kind of wireless or wired network.

The aggregator computing system 110 includes a processing circuit 112, an input/output (I/O) circuit 120, one or more specialized processing circuits shown as an account management circuit 122, e-mail circuit 124, zero-knowledge encryption circuit 126, transaction circuit 127, aggregator API circuit 128, and screen scraping circuit 129, a database 130, and one or more applications shown as server aggregator application 136 and client aggregator application 138. The processing circuit 112 may be coupled to the input/output device 120, the specialized processing circuits, and/or the database 130.

The processing circuit 112 may also be structured to manage the server aggregator application 136 and client aggregator application 138. The processing circuit 112 may include a processor 114 and a memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the computing system 110 is configured to run a variety of application programs and store associated data in a database of the memory 116 (e.g., database 130).

The input/output circuit 120 is structured to receive communications from and provide communications to other computing devices, users, and the like associated with the aggregator computing system 110. The input/output circuit 120 is structured to exchange data, communications, instructions, and the like with an input/output component of the user computing system 150 and/or the financial institution computing system 140. In some arrangements, the input/output device 120 includes communication circuitry for facilitating the exchange of data, values, messages, and the like between the input/output device 120 and the components of the aggregator computing system 110. In some arrangements, the input/output device 120 includes machine-readable media for facilitating the exchange of information between the input/output circuit 120 and the components of the aggregator computing system 110. In some arrangements, the input/output circuit 120 includes any combination of hardware components, communication circuitry, and machine-readable media.

In some arrangements, the I/O circuit 120 may include a network interface. The network interface may be used to establish connections with other computing devices by way of the network 105. The network interface may include program logic that facilitates connection of the aggregator computing system 110 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). For example, the I/O circuit 120 may include an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

In some arrangements, the I/O circuit 120 includes suitable input/output ports and/or uses an interconnect bus for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 120 may provide an interface for the user to interact with various applications (e.g., a server aggregator application 136, a client aggregator application 138) stored on the aggregator computing system 110. For example, the input/output circuit 120 may include a keyboard, a keypad, a mouse, joystick, a touch screen, a microphone, a biometric device, a virtual reality headset, smart glasses, and the like. As another example, input/output circuit 120, may include, but is not limited to, a television monitor, a computer monitor, a printer, a facsimile, a speaker, and so on.

The memory 116 may store a database 130, according to some arrangements. The database may retrievably store financial institution data in a financial institution vault 132 and/or may retrievably store user data at a user account vault 134. The financial institution data may be associated with at least one of a plurality of financial institutions and include various details regarding the financial institution such as transaction fees, FI application programming interface (API) parameters, and/or other information associated with a financial institution. The user data may be associated with a user (e.g., a customer of the service provider) and include information associated with the user such as a name, an address, a bank account identifier, a bank account routing identifier, usernames and passwords associated with the user and a financial institution, one or more e-mail address, and other information associated with the user. The user data may also include data associated with a transaction recipient such as a name, an address, a bank account identifier, a bank account routing identifier, and other information associated with the recipient. In some arrangements, the recipient may be associated with the user. For example, the recipient may include one or more of an individual, a financial institution (e.g., a bank, a credit union, or a mortgage lender), a service provider (e.g., a professional services provider or a retail store).

In some arrangements, the database 130 may be configured to store the executables for one or more applications such as the server aggregator application 136 or the client aggregator application 138. In some arrangements, the server aggregator application 136 and/or the client aggregator application 138 may be incorporated with an existing application in use by the aggregator computing system 110. In some arrangements, the server aggregator application 136 and/or the client aggregator application 138 is a separate software application implemented on the aggregator computing system 110. The server aggregator application 136 and/or the client aggregator application 138 may be downloaded by the aggregator computing system 110 prior to its usage, hard coded into the memory 116 of the processing circuit 112. In some arrangements, the server aggregator application 136 and/or the client aggregator application 138 may be a network-based or web-based interface application such that the aggregator computing system 110 may provide a web browser or executable application to access the server aggregator application 136 and/or the client aggregator application 138 (e.g., from the user computing system 150). Accordingly, the aggregator computing system 110 may include software and/or hardware capable of implementing a network-based or web-based application. For example, in some instances, the server aggregator application 136 and/or the client aggregator application 138 includes software such as HTML, XML, WML, SGML, PHP (Hypertext Preprocessor), CGI, and like languages.

In the latter instance, a user (e.g., a provider employee) may have to log onto or access the web-based interface before usage of the server aggregator application 136 and/or the client aggregator application 138. In this regard, the server aggregator application 136 and/or the client aggregator application 138 may be supported by a separate computing system including one or more servers, processors, network interface, and so on, that transmit applications for use to the aggregator computing system and/or other computing systems on the network 105 such as the user computing system 150.

The account management circuit 122 is structured facilitate generating and/or maintaining user accounts associated with the aggregator computing system 110. In some arrangements, the account management circuit 122 is also structured create and/or maintain user accounts associated with a financial institution. The account management circuit 122 includes an e-mail circuit 124 and a zero-knowledge encryption circuit 126. In an example arrangement, the account management circuit 122 is structured create and maintain an aggregator user account that is associated with the aggregator computing system 110.

In some arrangements, when a new user wants to create a new aggregator user account, the account management circuit 122 may facilitate creating the account. For example the account management circuit 122 may be structured to generate an aggregator account creation graphical user interface (GUI) (e.g., new account creation portal 410 in FIG. 5). The account creation GUI may be structured to receive an input (e.g., via the I/O circuits 120, 144, 154) that includes user data. The user data may include an aggregator username an aggregator password, a name, an address, a bank account identifier, a bank account routing identifier, a financial institution account, one or more e-mail address, and other information associated with the user. In some arrangements, the account creation GUI may also be structured to receive an input that includes recipient data. In some arrangements and as described above, the recipient data may include a name, an address, a bank account identifier, a bank account routing identifier, an email address, a phone number, and other information associated with the recipient. In some arrangements, the account management circuit 122 is structured retrievably store the user data and/or recipient data received via the account creation GUI in the user account vault 134.

The e-mail circuit 124 is structured to generate an e-mail address associated with an aggregator user account. In some arrangements, when a user creates an aggregator user account, the e-mail circuit 124 is structured to automatically generate a unique e-mail address for the aggregator user account. The e-mail circuit 124 may be structured to facilitate receiving and/or sending e-mails to/from the e-mail address. In some arrangements, the e-mail circuit 124 may be structured to generate an e-mail graphical user interface such that a user may access the e-mail circuit 124 to view, send, and/or receive e-mails. In some arrangements, the e-mail circuit 124 is part of or integrated with the aggregator computing system 110 and/or the account management circuit 122. In some arrangements, the e-mail circuit 124 is structured as a separate computing system coupled to the network 105 having a processing circuit, I/O circuit, and/or other circuitry to facilitate sending and/or receiving e-mails.

In some arrangements, the e-mail circuit 124 includes is structured to retrieve e-mail data from e-mails received by the email address. The e-mail circuit 124 may continuously (e.g., every millisecond, every 5 seconds, every minute, and so on) monitor an e-mail address to retrieve the e-mail data in real-time. The e-mail data may include one or more of a hyperlink, a password reset link, an account verification link, an authentication token, advertisements for one or more financial services, prices for the financial services, a coupon from a particular money transfer service comprising discount information, transaction data (e.g., a transaction confirmation, a transaction amount, a transaction date, a transaction time, a transaction description, a transaction memo, and other transaction data), recipient data (e.g., a recipient name, a recipient address, a recipient phone number), financial data from a FI (e.g., electronic account statements, deposit statements, credit history, transaction history, and other financial data), and the like. In some arrangements, the e-mail circuit 124 may screen scrape (e.g., by the screen scraping circuit 129 described below) the e-mail data from each received e-mail. In some arrangements, the e-mail circuit 124 may include an application programming interface (API) (e.g., the aggregator API circuit 128) that is structured to retrieve data from the email via an API.

In some arrangements, the e-mail circuit 124 is structured to generate a financial profile of a user based on, for example, e-mails received by the user from one or more financial institutions. In some arrangements, the e-mail circuit 124 is structured to direct e-mails received from the FI(s) to a dedicated inbox (e.g., a financial institution inbox). The e-mails from the FI(s) may include e-mail data including financial data, transaction data, coupons, promotional discounts, and the like from the FI(s) as described above. In some arrangements, the e-mail circuit 124 is structured to generate a financial profile of the user based on the e-mail data. For example, the e-mail circuit 124 may include electronic account statements, transaction history, transaction data, and other e-mail data in the financial profile of the user. In some arrangements, the e-mail circuit 124 is structured to update the finical profile continuously (e.g., every millisecond, every 5 seconds, every minute, and so on). In some arrangements, the e-mail circuit 124 is structured to provide the financial profile to the account management circuit 122 such that the financial profile can be associated with a aggregator user account (e.g., by the account management circuit 122).

In some arrangements, the e-mail circuit 124 is structured to determine a status of a transaction. The status of a transaction may include one or more of: (1) when a transaction has been initiated, (2) when a transaction is processing, (3) when a transaction is cancelled, and (4) when a transaction is completed. In some arrangements, the e-mail circuit 124 is structured to determine the status of the transaction without accessing the FI associated with the transaction (e.g., without using the aggregator API circuit 128). The e-mail circuit 124 may provide the status to one or more of the processing circuits of the aggregator computing system 110 (e.g., the transaction circuit 127). The e-mail circuit 124 and/or one or more of the processing circuits of the aggregator computing system 110 that received the status may be structured to generate and/or provide a notification including the status to the user.

The zero-knowledge encryption circuit 126 is structured to selectively generate a password. Specifically, the zero-knowledge encryption circuit 126 is structured to generate a password using a zero-knowledge encryption method such that an employee of the service provider cannot access the password. In some arrangements, the zero-knowledge encryption circuit 126 is structured to associate the password with a username. In some arrangements, the username may be a unique username that is generated by the account management circuit 122 and/or the zero-knowledge encryption circuit 126. In some arrangements, the username is the same as the e-mail address associated with the aggregator user account. In some arrangements, the zero-knowledge encryption circuit 126 is structured to retrievably store the password and the associated username at the user account vault 134.

In some arrangements, the account management circuit 122 is also structured to facilitate creating a new account at a financial institution. For example, a user may want to complete a financial transaction with a FI, such as the FI associated with the FI computing system 140, but the user may not have an account associated with the FI.

In some arrangements, the account management circuit 122 is structured to access an account creation webpage (e.g., new account creation portal 410 in FIG. 5) that is associated with the FI. In some arrangements, the account management circuit 122 is structured to display the account creation webpage to a user (e.g., via the I/O circuit 120, the user computing system 150, the I/O circuit 154, and so on). For example, the account management circuit 122 may provide the account creation webpage on the account creation GUI, or the account management circuit 122 may facilitate access to the webpage by a computing system on the network 105 (e.g., the user computing system 150). In some arrangements, the account management circuit 122 does not display the account creation webpage to the user such that the user does not have to access the account creation webpage.

In some arrangements, the account management circuit 122 is structured to retrievably store FI data that includes an indication of which parts of the user data are required to create a FI user account at the FI vault 132. In some arrangements, the account management circuit 122 is structured to determine what information is needed by the FI to create a FI user account. For example, the account creation webpage may include one or more text input fields that are structured to receive at least part of the user data such as a username, a password, a bank account identifier, and the like. The account management circuit 122 may determine the parts of the user data that are required to create a new FI user account based on the text input fields on the account creation webpage. In some arrangements, a provider employee may determine the parts of the user data that are required.

In some arrangements, the account management circuit 122 is structured to input the required parts of the user data at the account creation webpage. In an example arrangement, a FI may require a username, a password, a bank account identifier, a name, an address and an e-mail address. The account management circuit 122 and/or the zero-knowledge encryption circuit 126 is structured to generate a username and provide the username at a username text input field of the account creation webpage. The zero-knowledge encryption circuit 126 is structured to generate a password and provide the password at a password text input field. The account management circuit 122 may further be structured to retrieve user data including the bank account identifier, the name, the address and the e-mail address from the user account vault 134 and provide the bank account identifier, the name, the address and the e-mail address at a respective text input field of the of the account creation webpage.

In some arrangements, the FI may require an e-mail verification to finalize creating a new account. The e-mail circuit 124 may be structured to receive a verification e-mail from an e-mail address associated with the FI. The e-mail circuit 124 may complete the e-mail verification automatically, for example, by automatically accessing a verification hyperlink and/or automatically retrieving a verification token (e.g., an alpha numeric value) and providing the verification token at an e-mail verification webpage associated with the FI.

The transaction circuit 127 is structured to facilitate financial transactions. In some arrangements, the financial transactions may include a payment to an individual and/or a payment to a business or service provider. The financial transaction may be executed by a service provider such as a bank, a credit union, or other financial institution associated with the financial institution computing system 140. The financial institution may charge a fee for executing the financial transaction.

In some arrangements, the transaction circuit 127 is structured to determine a lowest cost or lowest fee financial institution, relative to other financial institutions to which a user has previously stored login information or otherwise pre-selected, such that a user can pay the least amount of money to complete the financial transaction. In some arrangements, the transaction circuit 127 is structured to determine the fee for completing the financial transaction at each of a plurality of financial institutions. The transaction circuit 127 may be structured to retrieve FI data from the FI computing system 140 to determine the fee for each FI. For example, the transaction circuit 127 may retrieve webpage prices from a financial institution webpage by screen scraping the webpage (e.g., by screen craping circuit 190). The transaction circuit 127 may retrieve API prices from a financial institution API (e.g., FI API 146) utilizing an aggregator API (e.g., aggregator API circuit 128). The transaction circuit 127 may retrieve e-mail prices from a financial institution e-mail advertisement by the e-mail circuit 124. The transaction circuit 127 may determine calculated prices by modifying at least one of the webpage prices, the API prices, and the e-mail prices with a coupon retrieved from a financial institution e-mail by the e-mail circuit 124.

In some arrangements, the transaction circuit 127 may determine the fee based on one or more fee parameters including a transaction date and time, a transaction amount, a transaction origin location, a transaction currency, a transaction destination location, and/or other transaction parameters that may impact the fee. For example, the fee may be dependent on the transaction amount (e.g., a fee equaling the greater of $5.00 or 5% of the transaction amount), the transaction destination (e.g., lower fees for destinations within the European Union, higher fees for destinations outside the European Union), and/or the currency difference between the origin and the destination (e.g., lower fees to exchange United States Dollars for Canadian Dollars, higher fees to exchange United States Dollars for Euros). In some arrangements, the transaction circuit 127 is structured to include a coupon or other discount when determining the fees for each FI. For example, the e-mail circuit 124 may receive an e-mail containing a coupon for a first FI, and the transaction circuit 127 may determine that the first FI is the lowest fee FI if the coupon is used to reduce the fee amount.

Figure 6:
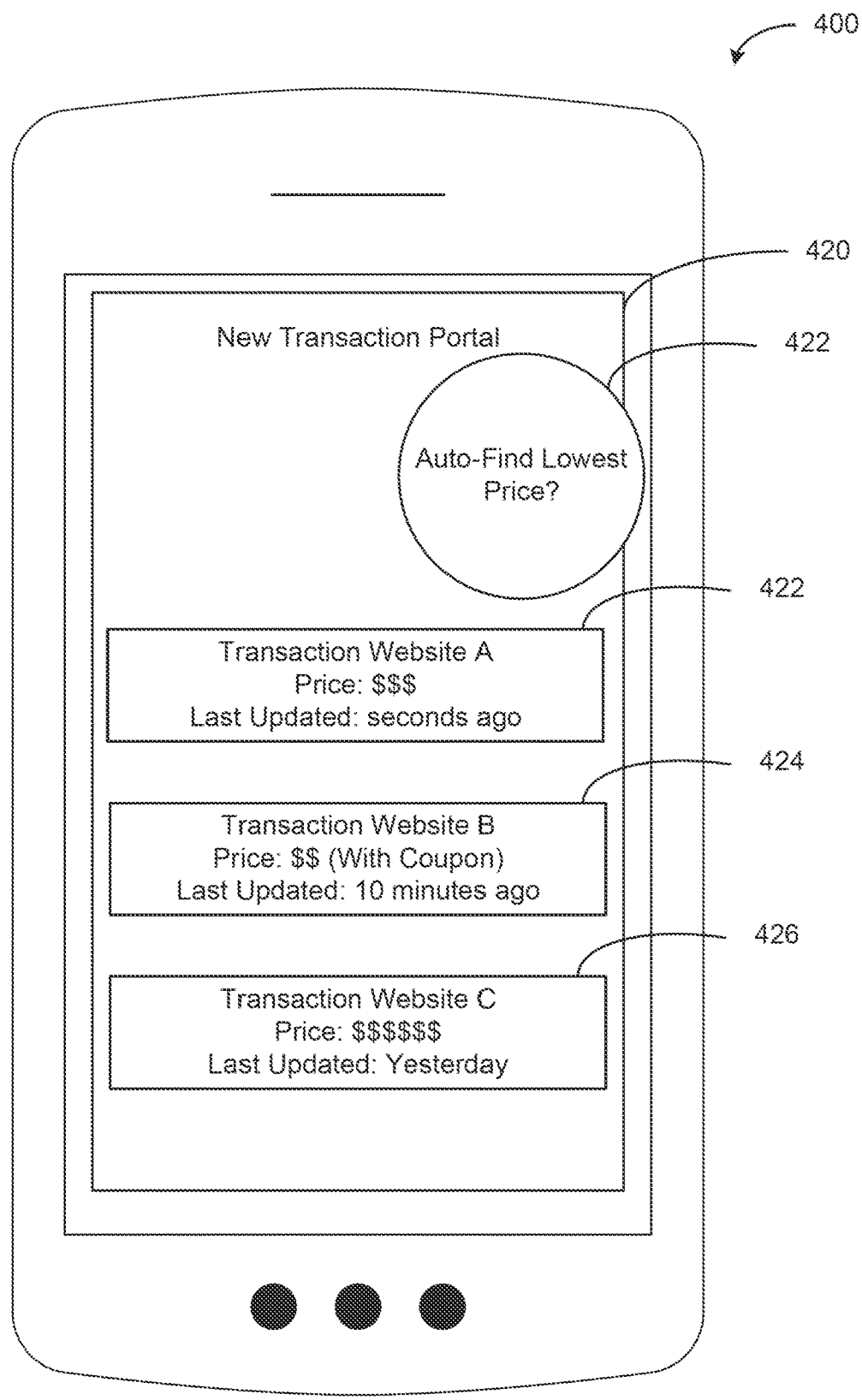
FIG. 6 is an illustration of some aspects of an aggregator application user interface showing a new transaction portal, according to an example arrangement.

In some arrangements, the transaction circuit 127 is structured to generate a FI selection GUI (e.g., new transaction portal 420 in FIG. 6). The transaction circuit 127 may be structured to provide the FI selection GUI to a user (e.g., via the I/O circuit 120, the user computing system 150, the I/O circuit 154, and so on). For example, the transaction circuit 127 may provide the GUI on a computing system on the network 105 (e.g., the user computing system 150). In some arrangements, the transaction circuit 127 does not display the FI selection GUI to the user such that the user does not have to access the FI selection GUI. In these arrangements, the transaction circuit 127 is structured to automatically select the lowest cost FI to execute the financial transaction.

In some arrangements, the transaction circuit 127 is structured to facilitate a financial transaction at a FI. The FI may be selected as a lowest cost FI, as described above. The transaction circuit 127 may access a FI transaction webpage (e.g., the FI transaction portal 430 of FIG. 7). In some arrangements, the transaction circuit 127 is structured to generate a transaction GUI that includes the FI transaction webpage. In some arrangements, the transaction circuit 127 is structured to provide the FI transaction webpage and/or the transaction GUI to a user via a computing system on the network 105 (e.g., the user computing system 150). In some arrangements, the transaction circuit 127 does not provide the webpage or the transaction GUI to the user such that the user does not have to access the webpage or the transaction GUI to complete the transaction.

In some arrangements, the FI transaction webpage includes one or more text input files that are sufficient to perform the transaction. The text input fields are structured to receive one or more parts of the user data and the recipient data. For example, the FI transaction webpage may require a user bank account identifier (e.g., a bank account number and/or a bank routing number), a user name, a user address, a user email, a recipient account identifier, a recipient name, a recipient address, and/or other information related to the user (e.g., the sender) and/or the recipient. In some arrangements, the transaction circuit 127 is structured to determine the parts of the user data and the recipient data are sufficient to populate each of the text input fields. In some arrangements, a provider employee may determine the parts of the user data and the recipient data are required to populate each of the text input fields. In some arrangements, the transaction circuit 127 may be structured to retrieve the user data and the recipient data from the user account vault 134 and automatically populate each of the text input fields with the user data and/or the recipient data.

In some arrangements, the transaction circuit 127 is structured to retrievably store transaction data including an indication of the recipient, the transaction amount, and/or other transaction data at the user account vault 134. In some arrangements, the transaction circuit 127 is structured to automatically execute financial transactions. For example, the transaction circuit 127 may be structured to automatically execute a recurring financial transaction (e.g., a mortgage payment) having the same recipient and the same transaction amount on a regularly repeated schedule (e.g., every month). In some arrangements, the transaction circuit 127 is structured to receive an input form a user indicating that the user wants to begin the automatically executed financial transactions. In some arrangements, the transaction circuit 127 is structured to start the automatically executed financial transactions based on an input form the recipient (e.g., the mortgage lender, etc.). In some arrangements, the transaction circuit 127 is structured to automatically start the automatically executed financial transactions based on previous the transaction data.

In some arrangements, the aggregator API circuit 128 is structured to facilitate accessing, by the aggregator computing system 110 and/or components thereof, the financial institution computing system 140 via a financial institution application programming interface shown as FI API circuit 146. The API circuit 128 is structured to retrieve financial institution data including fees for completing a financial transaction from the FI computing system 140 via the FI API circuit 146.

In some arrangements, the aggregator API circuit 128 is structured to facilitate accessing an account creation portal associated with the FI computing system 140 via the FI API circuit 146 such that the aggregator computing system 110 can retrievably store FI data including which parts of the user data and/or recipient data are required to open a new FI user account at the FI vault 132.

In some arrangements, the aggregator API circuit 128 is structured to facilitate accessing a transaction portal associated with the FI computing system 140 via the FI API circuit 146 such that the aggregator computing system 110 can retrievably store FI data including which parts of the user data and/or recipient data are required to execute a financial transaction at the FI vault 132.

The screen scraping circuit 129 is structured to facilitate scraping data (e.g., intercepting data as the user performs data entry and/or parsing data from a document, such as an e-mail) The data may include FI data such as transaction fees, required information to open a new account, required information to execute a transaction, or other FI data. The data may include user data such as coupons, verification tokens, password reset links, or other user data. The data may also include recipient data such as a name, an address, or other recipient data. For example, the screen scraping circuit 129 may be structured to scrape recipient data when a user manually inputs recipient data at a transaction webpage associated with an FI. The screen scraping circuit 129 may be structured to retrievably store FI data at the FI vault 132 and user data and recipient data the user account vault 135.

The server aggregator application 136 is structured to facilitate a user's remote access to the aggregator computing system 110 (e.g., via the user computing system 150). For example, the server aggregator application 136 may be structured as a web-based application such as a web browser extension. For example, the user may access the server aggregator application 136 by a webpage or by a browser extension.

In some arrangements, the server aggregator application 136 is structured to provide one or more GUIs to the user. The one or more GUIs may include one or more of the account creation GUI, the FI selection GUI, and the transaction GUI. In some arrangements, the server aggregator application 136 is structured to receive a user input via the one or more GUIs and provide the user input to one or more of the specialized circuits of the aggregator computing system 110.

The client aggregator application 138 is structured to facilitate a user's remote access to the aggregator computing system 110 (e.g., via the user computing system 150). For example, the client aggregator application 138 may be structured as a an application such as a mobile application for a smart device (e.g., smart phone, smart watch, tablet and the like) or a computer application for a personal computer (e.g., desktop, laptop, and the like). For example, the client aggregator application 138 may be downloadable and/or installable on the user computing system 150.

In some arrangements, the client aggregator application 138 is structured to provide one or more GUIs to the user. The one or more GUIs may include one or more of the account creation GUI, the FI selection GUI, and the transaction GUI. In some arrangements, the client aggregator application 138 is structured to receive a user input via the one or more GUIs and provide the user input to one or more of the specialized circuits of the aggregator computing system 110.

In some arrangements, the server aggregator application 136 and/or the client aggregator application 138 are structured to facilitate access to the aggregator computing system 110 and/or an aggregator user account for a user across multiple user computing devices (e.g., user computing systems 150), such as a smart phone, a laptop, a desktop, a tablet, etc. In some arrangements, the user may access the aggregator user account at any of the user computing devices by inputting a username and/or password associated with the aggregator user account. In some arrangements, the user may access the aggregator user account by providing a security token such as a physical security token (e.g., a device comprising a security chip, a security USB device, and/or a security card) or a biometric security token by providing a facial scan, a rental scan, a fingerprint scan, and the like. Accordingly, the user computing system 150 may include a scanner and/or a camera that facilitates user input of such pictorial information.

In some arrangements, the server aggregator application 136 and/or the client aggregator application 138 may be structured as or may include an executable that is provided to the user computing system (e.g., as a web-browser extension, a mobile application, and the like). In some arrangements, the server aggregator application 136 and/or the client aggregator application 138 is structured to determine whether the user computing system 150 has opened a user browser (e.g., Edge, Chrome, Firefox, Safari, etc.) by periodically (e.g., every 500 milliseconds, every second, every 5 seconds, etc.) monitoring active system tasks on the user computing system 150 and identifying a predetermined task associated with a particular browser application. The server aggregator application 136 and/or the client aggregator application 138 may also be structured to provide a hyperlink to the user computing system 150. The hyperlink may be associated with a money transfer service for a particular financial institution computing system 140 and may be obtained via an API and/or retrievably stored (e.g., in the financial institution vault 132). The server aggregator application 136 and/or the client aggregator application 138 may also determine whether the user browser is navigated to the hyperlink. The hyperlink may be associated with a financial institution and include a webpage such as a transaction webpage, an account creation webpage, or other webpage of the financial institution.

In some arrangements, the server aggregator application 136 and/or the client aggregator application 138 may also be structured to receive or intercept a user input to the webpage. For example, the server aggregator application 136 and/or the client aggregator application 138 may be structured to receive or intercept the user input as the user is typing into one or more text fields of the webpage. In some arrangements, the server aggregator application 136 and/or the client aggregator application 138 may provide the user input to the aggregator computing system 110 including the account management circuit 122 and the transaction circuit 127. The aggregator computing system 110 may determine that (1) whether a financial institution account exists, and/or (2) whether a recipient data entered by the user exists in the user account vault 134. If the aggregator computing system 110 determines that the user account does not exist, the account management circuit 122 (described in detail below) may be structured to facilitate generating a new financial institution account. In some arrangements, the account management circuit 122 is structured to automatically generate the new financial institution account such that the account generation process is non-intrusive to the user. Specifically, account management circuit 122 may hide the account generation process from the user. If the aggregator computing system 110 determines that the recipient data does not exist in the user account vault 134, the server aggregator application 136 and/or the client aggregator application 138 may be structured to retrieve the recipient data from the webpage and provide the recipient data to the aggregator computing system 110. The aggregator computing system 110 may retrievably store the recipient data in the user account vault 134 and/or associate the recipient data with an aggregator user account. In some arrangements, the server aggregator application 136 and/or the client aggregator application 138 the recipient data is captured in a way that is non-intrusive to the user. The financial institution computing system 140 includes a processing circuit 142, an input/output (I/O) circuit 144, a specialized processing circuit shown as a FI API circuit 146, and a database 148. The processing circuit 142, the input/output circuit 144, and the database 148 may be the same or substantially similar to the processing circuit 112, the I/O circuit 120, and the database 130 of the aggregator computing system 110. For example, the processing circuit 142 may include a processor and memory that is similar to or substantially the same as the processor 114 and memory 116.

In some arrangements, the server aggregator application 136 and/or the client aggregator application 138 may be structured to automatically populate one or more text fields of the webpage. In some arrangements, the server aggregator application 136 and/or the client aggregator application 138 prompts the user for approval to automatically populate the one or more text fields. For example, the server aggregator application 136 and/or the client aggregator application 138 may be structured to identify each of the text fields on the webpage and automatically populate each of the text fields with the appropriate data (e.g., user data, recipient data, FI data, e-mail data, and/or any other data stored by the aggregator computing system 110). In some arrangements, the server aggregator application 136 and/or the client aggregator application 138 may identify each of the text fields automatically (e.g., by screen scraping text field descriptions or titles by screen craping circuit 129, by identifying text fields via the aggregator API circuit 128, and/or by intercepting user inputs to each of the text fields and determining the type of data input by a user). In some arrangements, the server aggregator application 136 and/or the client aggregator application 138 includes a list or another cross-referencing resource that indicates which data type each text field on a webpage is structured to receive. In some arrangements, the list is automatically generated by one or more processors of the aggregator computing system. In some arrangements, the list is manually generated (e.g., by an employee of the service provider).

In some arrangements, the server aggregator application 136 and/or the client aggregator application 138 may also be structured to intercept a user input to each of the text fields responsive to a user not approving automatic population of the text fields. In these arrangements, the server aggregator application 136 and/or the client aggregator application 138 may generate an indication that the user may have made an error (e.g., a typo, an incorrect copy/paste, an inconsistency with previous transactions, and the like) when populating the text fields. The server aggregator application 136 and/or the client aggregator application 138 may provide the indication to the user via a user interface (e.g., an aggregator application user interface 500 shown in FIGS. 5-7). For example, the server aggregator application 136 and/or the client aggregator application 138 may flag and/or alert the user to a field filled with the wrong data based on data stored by the aggregator computing system 110. In some arrangements, the server aggregator application 136 and/or the client aggregator application 138 may provide a displayable prompt to the user to automatically correct the error. In some arrangements, the server aggregator application 136 and/or the client aggregator application 138 may provide a displayable prompt that includes possible automatically determined corrections for the error. In some arrangements, the server aggregator application 136 and/or the client aggregator application 138 may prevent the user from accessing the next step of the transaction process on the webpage until the inconsistency is resolved.

In some arrangements, the financial institution computing system 140 is structured to execute a financial transaction. The financial institution computing system 140 includes a FI API circuit 146 that is structured to facilitate access to FI data. The financial institution computing system 140 also includes a database 148 that is structured to retrievably store the FI data.

The user computing system 150 includes a processing circuit 152, an input/output (I/O) circuit 154, and a database 156. The processing circuit 152, the input/output circuit 154, and the database 156 may be the same or substantially similar to the processing circuit 112, the I/O circuit 120, and the database 130 of the aggregator computing system 110. For example, the processing circuit 152 may include a processor and memory that is similar to or substantially the same as the processor 114 and memory 116. Additionally, in some arrangements, the database 156 is structured to retrievably store user data and/or recipient data.

In some arrangements, the user computing system 150 may be structured as a personal computing device such as a desktop computer or a laptop computer that includes various input/output devices such as a display, a keyboard, a mouse, a microphone, a camera, one or more biometric sensors, and the like. In some arrangements, the user computing system 150 may be structured as a smart device such as a smartphone, a smart watch, smart glasses, and the like.

Figure 2:
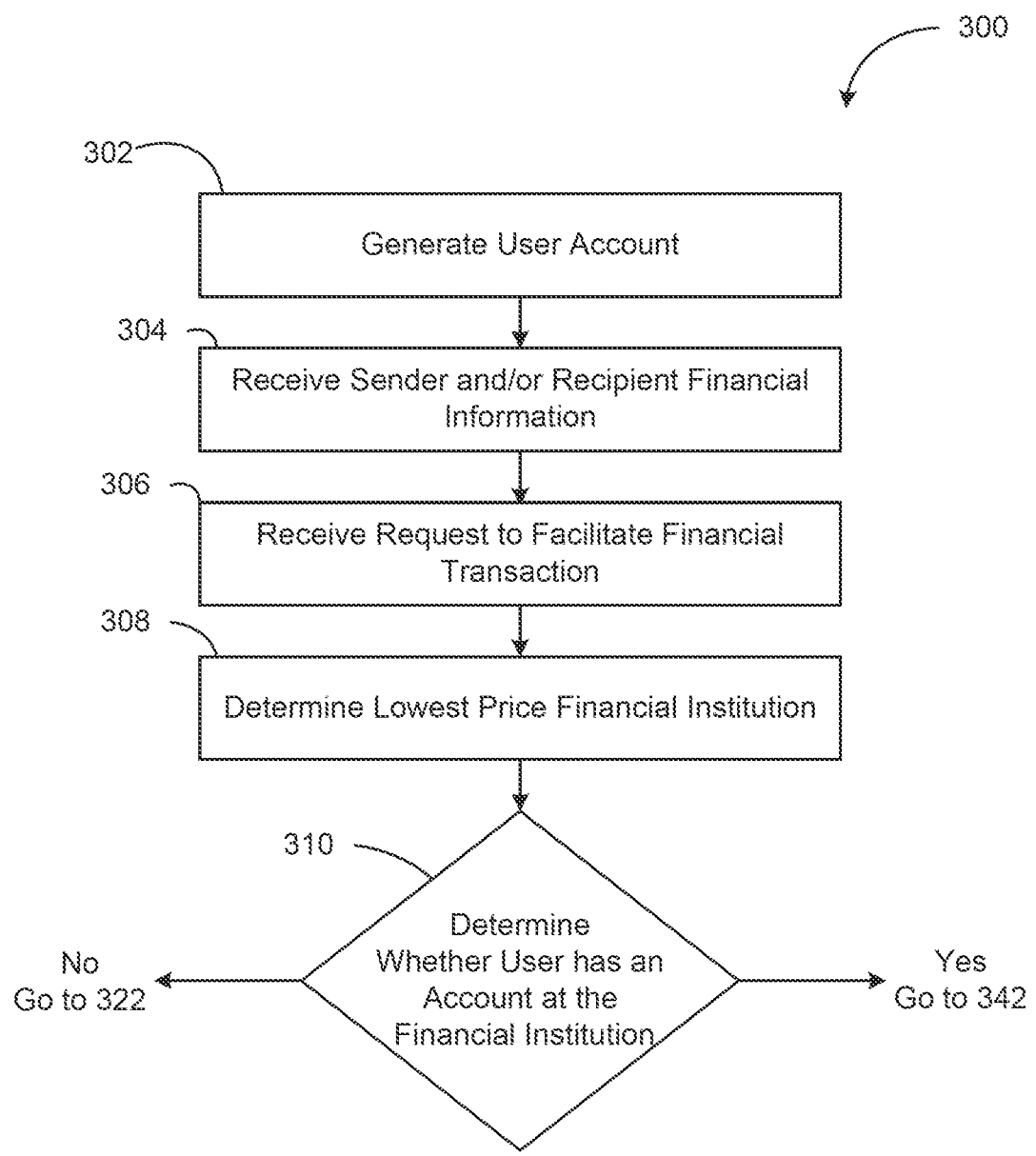
FIG. 2 is flow diagram of a method for initiating a financial transaction using the system of FIG. 1, according to an example arrangement.

FIG. 2 is flow diagram of a method 300 for initiating a financial transaction using the system of FIG. 1, according to an example arrangement. One or more of the computing systems of the computing system 100 may be configured to perform method 300. In an example arrangement, the aggregator computing system 110 may, alone or in combination with other computing systems such as the FI computing system 140 and the user computing system 150 may perform the method 300. In an example arrangement, the method 300 is performed by the aggregator computing system 110 and one or more of the server aggregator application 136 and the client aggregator application 138. Further, the method 300 may include user inputs from a user (e.g., a sender of a transaction) one or more user devices (such as the user computing system 150), another computing device on the network 105, and the like.

In broad overview of method 300, at step 302, aggregator computing system 110 generates a user account. At step 304, the aggregator computing system 110 receives sender and/or recipient financial information. At step 306, the aggregator computing system 110 receives a request to facilitate a financial transaction. At step 308, the aggregator computing system 110 determines a lowest price financial institution. At step 310, the aggregator computing system 110 determines whether the user has an account at the financial institution.

Referring to the method 300 in more detail, at step 302, the aggregator computing system 110 generates a user account. Specifically, the aggregator computing system 110 generates an aggregator user account. The aggregator computing system 110 may generate the aggregator user account using the account management circuit 122, the e-mail circuit 124, and/or the zero-knowledge encryption circuit 126 as described above with respect to FIG. 1. In some arrangements, and as described above, account management circuit 122 may generate the account creation GUI and provide the GUI to the user via the server aggregator application 136 and/or the client aggregator application 138. In some arrangements, if a user already has an aggregator user account, the aggregator computing system 110 may facilitate accessing the user account at step 302.

At step 304, the aggregator computing system 110 receives sender and/or recipient financial information. Specifically, the aggregator computing system 110 may receive any user data and/or recipient data that is required to create a user account at a FI and/or that is required to execute a transaction at a FI. In some arrangements, the aggregator computing system 110 is structured to receive the user data and/or the recipient data by a user input (e.g., by a keyboard of the user computing system 150). In some arrangements, the aggregator computing system 110 is structured to retrieve the user data and/or the recipient data via the screen scraping circuit 129. For example, the screen scraping circuit 129 may scrape the user data and/or the recipient data from a financial institution webpage. In some arrangements, if a user has already provided the user data and/or the recipient data or if the aggregator computing system 110 has already retrieved the user data and/or the recipient data, the aggregator computing system 110 may skip step 304.

At step 306, the aggregator computing system 110 receives a request to facilitate a financial transaction. For example, a user may access the aggregator computing system 110 via the user computing system 150 and one of the sever aggregator application 136 and the client aggregator application 138 and input a request to facilitate a financial transaction. The input may include a request to facilitate a single financial transaction, multiple financial transactions, and/or automatic recurring financial transactions.

At step 308, the aggregator computing system 110 determines a lowest price financial institution. Specifically, as described above, the transaction circuit 127 may retrieve webpage prices from a financial institution webpage by screen scraping the webpage by screen craping circuit 190, API prices from FI API 146 utilizing aggregator API circuit 128, and e-mail prices from a financial institution e-mail advertisement by the e-mail circuit 124. The transaction circuit 127 may determine calculated prices by modifying at least one of the webpage prices, the API prices, and the e-mail prices with a coupon retrieved from a financial institution e-mail by the e-mail circuit 124. Additionally, and as described above, the transaction circuit 127 may generate the FI selection GUI and provide the FI selection GUI to the user via the server aggregator application 136 and/or the client aggregator application 138. In some arrangements, the user may select the FI via the FI selection GUI. In some arrangements, the transaction circuit 127 may automatically select the FI based on the fee associated with the FI.

At step 310, the aggregator computing system 110 determines whether the user has an account at the financial institution. The aggregator computing system 110 may access the user account vault 134 to verify if a FI user account has already been created. If the FI user account has not been created the aggregator computing system 110 goes to step 322 of FIG. 3. If the FI user account has been created the aggregator computing system 110 goes to step 342 of FIG. 4.

Figure 3:
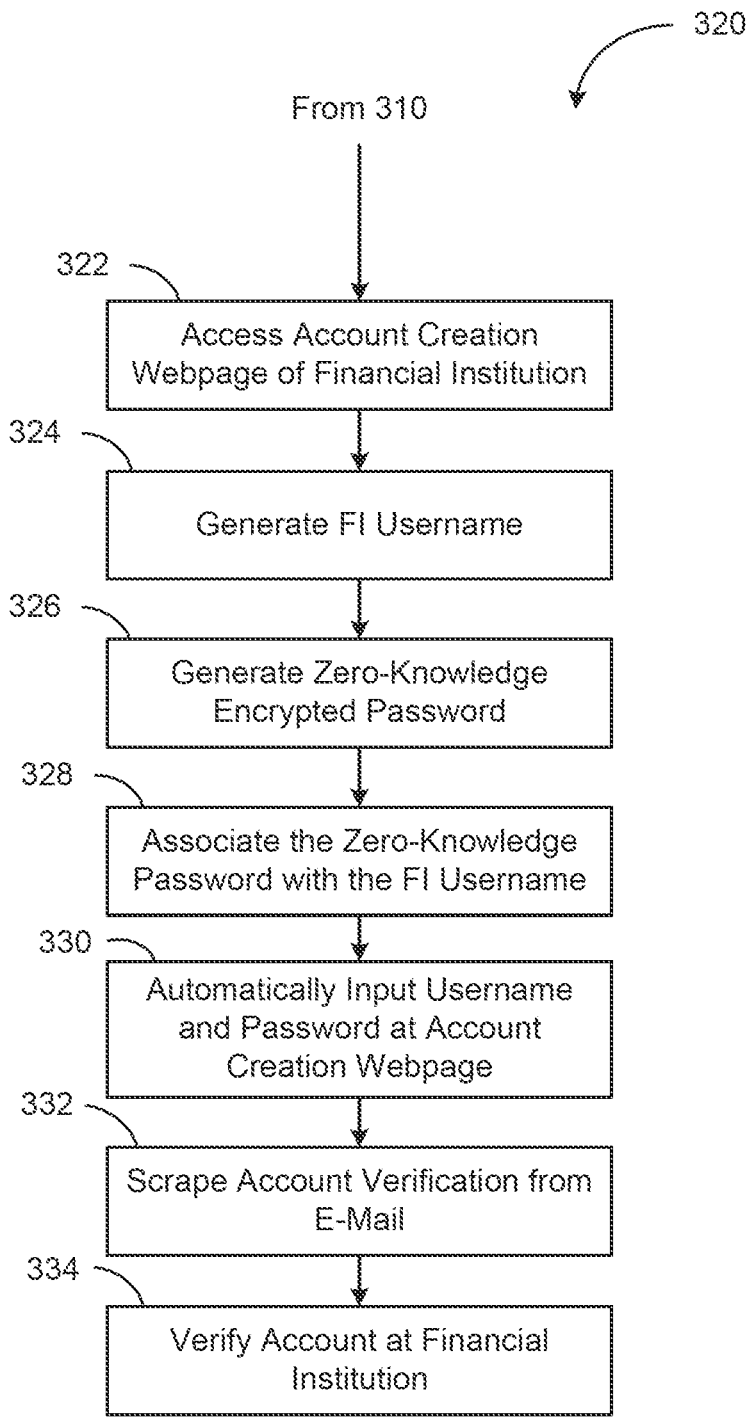
FIG. 3 is a flow diagram of a method for creating a new user account at a financial institution using the system of FIG. 1, according to an example arrangement.

FIG. 3 is a flow diagram of a method 320 for creating a new user account at a financial institution using the system of FIG. 1, according to an example arrangement. One or more of the computing systems of the computing system 100 may be configured to perform method 320. In an example arrangement, the aggregator computing system 110 may, alone or in combination with other computing systems such as the FI computing system 140 and the user computing system 150 may perform the method 320. In an example arrangement, the method 320 is performed by the aggregator computing system 110 and one or more of the server aggregator application 136 and the client aggregator application 138. Further, the method 320 may include user inputs from a user (e.g., a sender of a transaction) one or more user devices (such as the user computing system 150), another computing device on the network 105, and the like.

In broad overview of method 320, at step 322, aggregator computing system 110 accesses an account creation webpage of a financial institution. At step 324, the aggregator computing system 110 generates a FI username. At step 326, the aggregator computing system 110 generates a zero-knowledge encrypted password. At step 328, the aggregator computing system 110 associates the zero-knowledge encrypted password with the FI username. At step 330, the aggregator computing system 110 automatically inputs the FI username and the zero-knowledge encrypted password at the account creation webpage. At step 332, the aggregator computing system 110 scrapes an account verification from an e-mail. At step 332, the aggregator computing system 110 verifies the account at the FI.

Referring to the method 320 in more detail, at step 322, aggregator computing system 110 accesses an account creation webpage of a financial institution. As described above, the account creation webpage may include one or more text input fields structured to receive user data. In some arrangements, the aggregator computing system 110 is structured to facilitate access of the account creation webpage to the user via the user computing system 150 (e.g., via the server aggregator application 136 and/or the client aggregator application 138). In some arrangements, the aggregator computing system 110 is structured to access the account creation webpage without displaying the webpage to the user.

At step 324, the aggregator computing system 110 generates a FI username. Specifically, the account management circuit 122 and/or the zero-knowledge encryption circuit 126 is structured to generate the FI username. In some arrangements, the FI username is a unique username. In some arrangements, the FI username is the same as the e-mail address associated with the aggregator user account.

At step 326, the aggregator computing system 110 generates a zero-knowledge encrypted password. As described above, the zero-knowledge encryption circuit 126 is structured to generate a password for the FI user account. The password is substantially unknown to employees of the service provider associated with the aggregator computing system 110.

At step 328, the aggregator computing system 110 associates the zero-knowledge encrypted password with the FI username. In some arrangements, the aggregator computing system 110 may retrievably store the FI username and the password at the user account vault 134 and associate both with one of the plurality of FIs.

At step 330, the aggregator computing system 110 automatically inputs the FI username and the zero-knowledge encrypted password at the account creation webpage. In some arrangements, the aggregator computing system 110 is also structured to input other parts of the user data. For example and as described above, the aggregator computing system 110 may provide a name, an address, a bank account identifier, and/or other parts of the user data related to creating a new FI user account.

At step 332, the aggregator computing system 110 accesses an account verification from an e-mail. In some arrangements, the e-mail circuit 124 may be structured to access an account verification token from an e-mail. The account verification token may include a selectable hyperlink, an alphanumeric code, or other type of verification token.

At step 332, the aggregator computing system 110 verifies the account at the FI. In some arrangements, the aggregator computing system 110 is structured to provide the verification token to an account verification webpage associated with the FI. Additionally, the e-mail circuit 124 may be structured to access an e-mail confirming that the FI user account was successfully verified.

Figure 4:
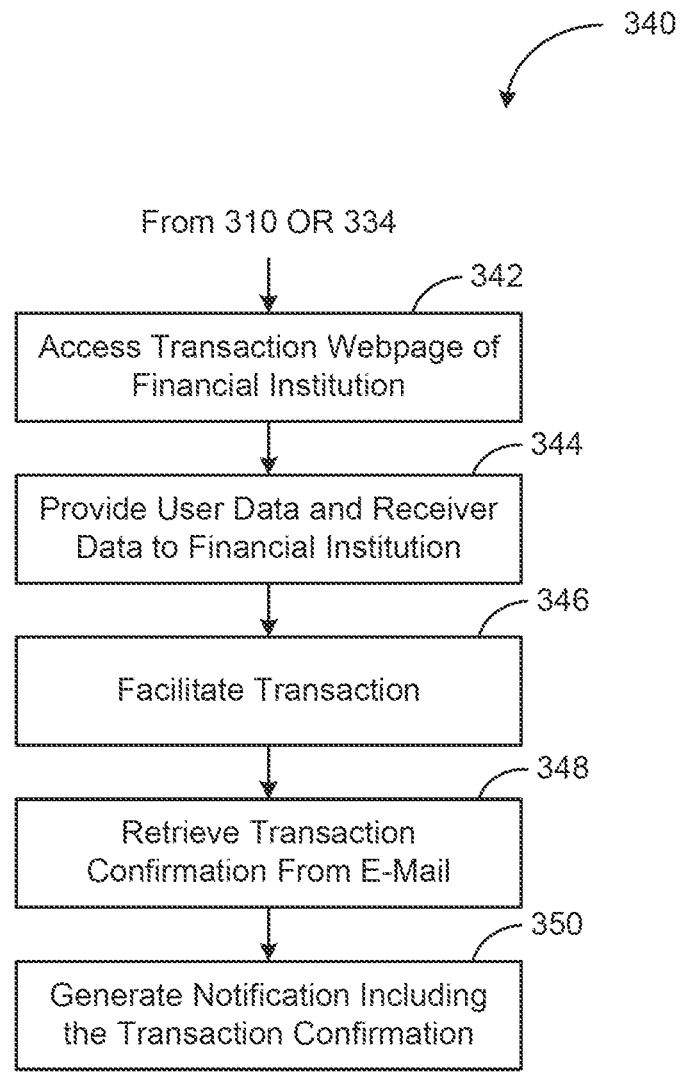
FIG. 4 is a flow diagram of a method for completing a financial transaction using the system of FIG. 1, according to an example arrangement.

FIG. 4 is a flow diagram of a method 340 for completing a financial transaction using the system of FIG. 1, according to an example arrangement. One or more of the computing systems of the computing system 100 may be configured to perform method 340. In an example arrangement, the aggregator computing system 110 may, alone or in combination with other computing systems such as the FI computing system 140 and the user computing system 150 may perform the method 340. In an example arrangement, the method 340 is performed by the aggregator computing system 110 and one or more of the server aggregator application 136 and the client aggregator application 138. Further, the method 340 may include user inputs from a user (e.g., a sender of a transaction) one or more user devices (such as the user computing system 150), another computing device on the network 105, and the like.

In broad overview of method 340, at step 342, the aggregator computing system 110 accesses a transaction webpage of the financial institution. At step 344, the aggregator computing system 110 provides user data and receiver data to the FI. At step 346, the aggregator computing system 110 facilitates the transaction. At step 348, the aggregator computing system 110 retrieves a transaction confirmation from an e-mail. At step 350, the aggregator computing system 110 generates a notification including the transaction confirmation.

Referring to the method 340 in more detail, at step 342, the aggregator computing system 110 accesses a transaction webpage of the financial institution. As described above, the transaction webpage may include one or more text input fields structured to receive user data and/or recipient data. In some arrangements, the aggregator computing system 110 is structured to facilitate access of the transaction webpage to the user via the user computing system 150 (e.g., via the server aggregator application 136 and/or the client aggregator application 138). In some arrangements, the aggregator computing system 110 is structured to access the transaction webpage without displaying the webpage to the user.

At step 344, the aggregator computing system 110 provides user data and recipient data to the FI. In some arrangements, the aggregator computing system 110 automatically provides the user data and the recipient data without user input.

At step 346, the aggregator computing system 110 facilitates the transaction. In some arrangements, the aggregator computing system 110 is structured to send a request to the FI to execute the transaction via the transaction webpage.

At step 348, the aggregator computing system 110 retrieves a transaction confirmation from an e-mail. In some arrangements, the e-mail circuit 124 is structured to retrieve the transaction confirmation from an e-mail from the FI. The transaction confirmation may include one or more of a confirmation that the transaction has been initiated by the FI, confirmation that the transaction has been executed by the FI, and confirmation that the transaction has received by the recipient.

At step 350, the aggregator computing system 110 generates a notification including the transaction confirmation. In some arrangements, the notification may include one or more of a push notification on a smart device, an e-mail to the e-mail associated with the e-mail circuit 124 and/or another email address, and/or a text message or voice message sent to a telephone.

Figure 5:
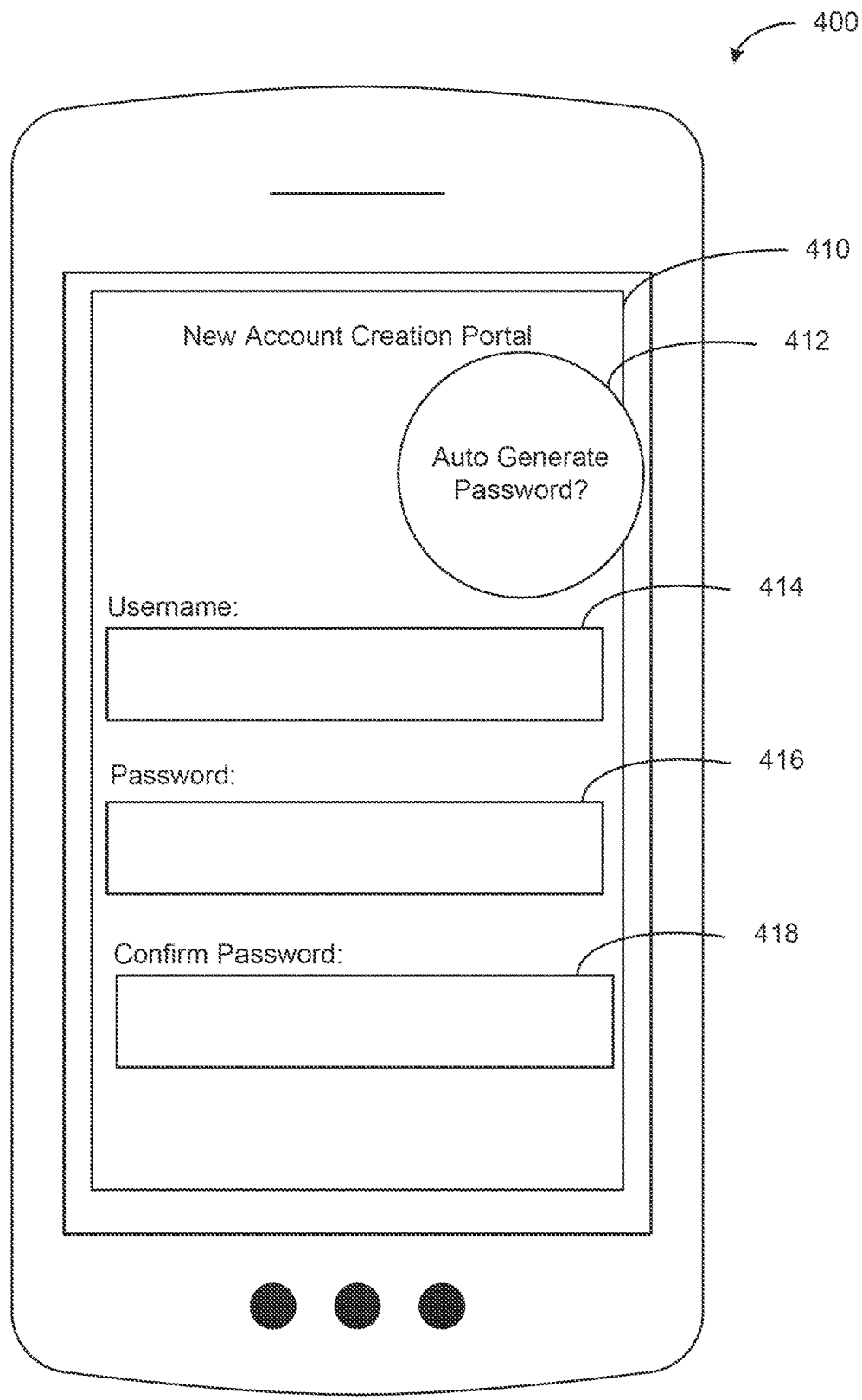
FIG. 5 is an illustration of some aspects of an aggregator application user interface showing a new account creation portal, according to an example arrangement.
Figure 7:
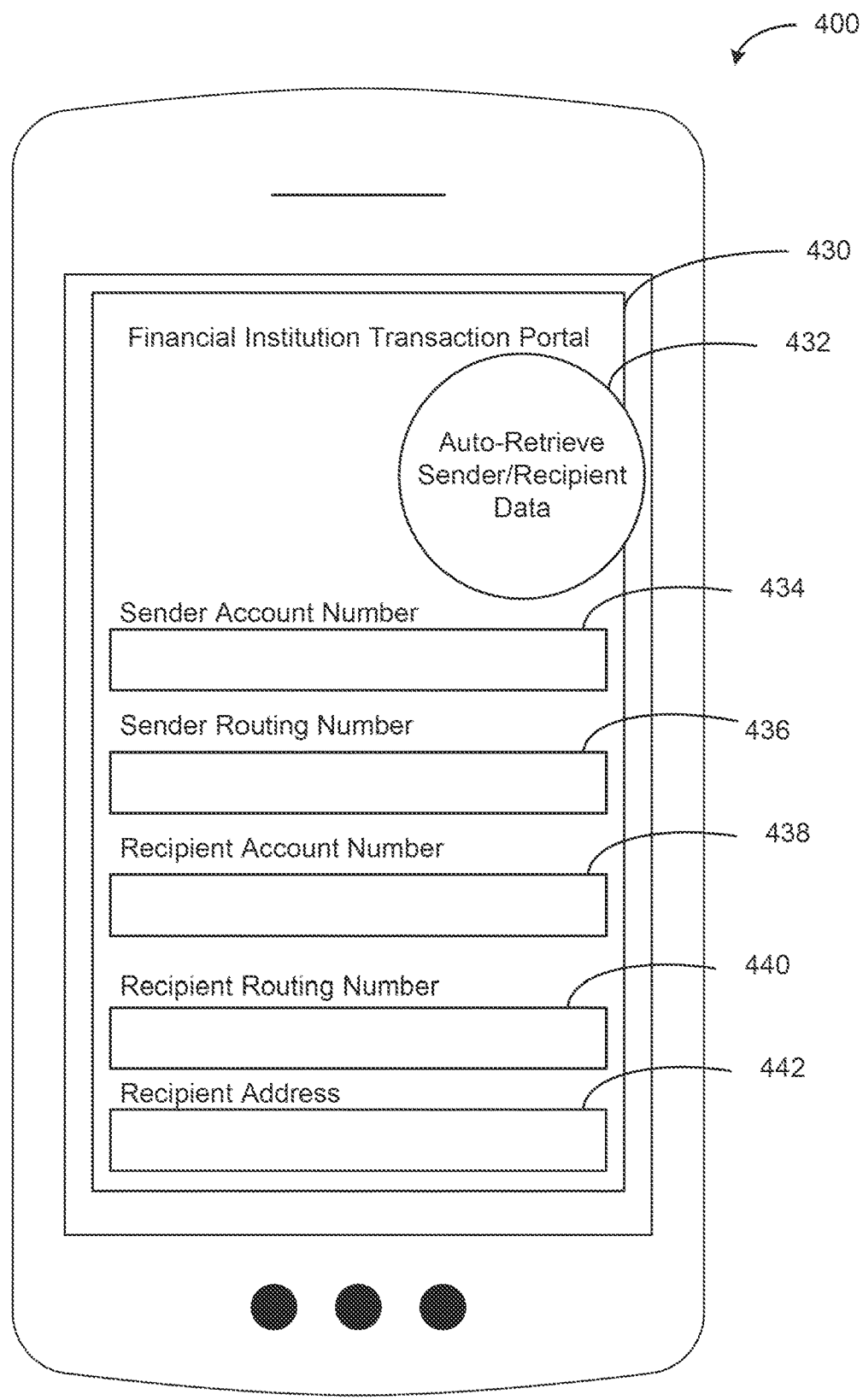
FIG. 7 is an illustration of some aspects of an aggregator application user interface showing a financial institution transaction portal, according to an example arrangement.

Referring generally to FIGS. 5-7, illustrations of some aspects of an aggregator application user interface 400 are shown according to various example arrangements. The aggregator computing system 110 may be structured to provide the aggregator application user interface 400 to the user computing system 150 (e.g., via the server aggregator application 136 and/or client aggregator application 138). In some arrangements, the aggregator application user interface 400 is structured to display or facilitate access to a webpage (e.g., a webpage associated with the FI computing system 140). For example, one or more of the new account creation portal 410 (FIG. 5), the new transaction portal 420 (FIG. 6), and the financial institution transaction portal 430 (FIG. 7) may be a webpage, and the aggregator application user interface 400 may be structured to display and/or facilitate access to the webpages.

FIG. 5 is an illustration of some aspects of an aggregator application user interface 400 showing a new account creation portal 410, according to an example arrangement. In some arrangements, the aggregator computing system 110 is structured to provide the new account creation portal 410 on the aggregator application user interface 400 when a user wants to create a new user account. In some arrangements, the new user account may be an aggregator user account. In some arrangements the new user account may be a FI user account.

The account creation portal 410 includes an aggregator application executable 412, a username input field 414, a password input field 416, and a confirm password input field 418. The username input field 414, the password input field 416, and the confirm password input field 418 are each structured to receive an alpha numeric value.

As shown, the aggregator application executable 412 includes a prompt to automatically generate a password (e.g., by the zero-knowledge encryption circuit 126). The aggregator application executable 412 is structured to access the server aggregator application 136 and/or client aggregator application 138 such that the zero-knowledge encryption circuit 126 may automatically generate a password and automatically populate the password input field 416, and the confirm password input field 418. In some arrangements, the zero-knowledge encryption circuit 126 may also generate a username and automatically populate the username field 414.

In some arrangements, the account creation portal 410 includes additional text input fields such as an address input field, an e-mail address input field, and the like. In these arrangements, the aggregator application executable 412 may be structured to automatically populate the additional text input fields if the aggregator computing system has access to the parts of the user data that are associated with each of the additional input fields.

FIG. 6 is an illustration of some aspects of an aggregator application user interface 400 showing a new transaction portal 420, according to an example arrangement. In some arrangements, the aggregator computing system 110 is structured to provide the new transaction portal 420 on the aggregator application user interface 400 when a user wants to initiate a new transaction.

The new transaction portal 420 includes an aggregator application executable 422, and a plurality of icons showing FI data shown as icons 422, 424, 426. The icons 422, 424, 426 are structured to display a summary of the FI data. In an example arrangement and as shown in FIG. 6, the summary of the FI data may include a FI name, a price, an indication of whether a coupon is used, and an indication of the last time the price was updated. A user may select one of the icons 422, 424, 426 to indicate which of the FIs the user wants to execute the transaction with. In some arrangements, the new transaction portal 420 includes additional icons, each representing a different FI.

As shown, the aggregator application executable 422 includes a prompt to automatically find the lowest price (e.g., by the transaction circuit 127). The aggregator application executable 422 is structured to access the server aggregator application 136 and/or client aggregator application 138 such that the transaction circuit 127 may automatically select the lowest price FI for completing a transaction.

FIG. 7 is an illustration of some aspects of an aggregator application user interface 400 showing a financial institution transaction portal 430, according to an example arrangement. In some arrangements, the aggregator computing system 110 is structured to provide the financial institution transaction portal 430 on the aggregator application user interface 400 when a FI has been selected to execute a transaction.

The FI transaction portal 430 includes an aggregator application executable 432, a sender account number text input field 434, a sender routing number text input field 436, a recipient account number text input field 438, a recipient routing number text input field 440, and a recipient address text input field 442. The text input fields are each structured to receive an alpha numeric value associated with the label above the text field box.

As shown, the aggregator application executable 432 includes a prompt to automatically retrieve sender and recipient data. The aggregator application executable 432 is structured to access the server aggregator application 136 and/or client aggregator application 138 such that the transaction circuit 127 may automatically access the financial institution transaction portal 430. In some embodiments, the transaction circuit 127 may be structured to scrape the FI transaction portal 430 for user data and recipient data and retrievably store the user data and/or recipient data at the user account vault 134. In some embodiments, the transaction circuit 127 is structured to retrieve the user data and/or recipient data from the user account vault 134 and selectively provide at least part of the user data and/or recipient data at each of the text input fields.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S.C. § 112(f), unless the element is expressly recited using the phrase "means for."

As used herein, the term "circuit" may include any combination of hardware structured to execute the functions described herein and software structured to include instructions for the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system structured to facilitate financial transactions, the system comprising:
   an account management circuit structured to generate a user account, the user account associated with a user, the account management circuit comprising an e-mail circuit;
   a user account vault structured to retrievably store user data associated with the user;
   an executable structured to be provided to a user computing system, the executable structured to:
     determine whether a user browser is in an open state on the user computing system;
     determine whether the user browser is in a navigated state to a first hyperlink, the first hyperlink associated with a first webpage of a first financial institution of a plurality of financial institutions; and
     intercept a user input provided by the user to the first webpage via the user browser; and
   a transaction circuit structured to:
     based on the user input to the first webpage, determine whether a first financial institution account associated with the first financial institution and the user exists in the user account vault;
     facilitate, responsive to determining that the first financial institution account exists, a financial transaction at the first financial institution;
     receive, via the e-mail circuit from the first financial institution, a confirmation that the financial transaction is completed;
     generate a first notification comprising the confirmation; and
     provide the first notification to the user computing system.

2. The system of claim 1, wherein the transaction circuit is further structured to:
   receive the user input via the executable;
   determine whether the user input comprises recipient data, the recipient data associated with a recipient of funds;
   determine, responsive to determining that the user input comprises the recipient data, whether the recipient data is stored in the user account vault; and
   retrievably store, responsive to determining that the recipient data is not stored in the user account vault, the recipient data in the user account vault.

3. The system of claim 2, wherein the user data comprises at least one of a user name, a user address, a user account identifier, and a user e-mail and the recipient data comprises at least one of a recipient name, a recipient address, and a recipient account identifier.

4. The system of claim 3, wherein facilitating the financial transaction by the transaction circuit comprises:
   providing a second hyperlink to the user computing system, the second hyperlink associated with a second webpage of the first financial institution, the second webpage comprising a plurality of text fields, each of the plurality of text fields structured to receive at least one the user data and the recipient data;
   wherein the executable is structured to:
     generate a first prompt for the user, the first prompt including a request to automatically populate the plurality of text fields;
     provide the first prompt to the user computing system;
     automatically populate, responsive to receiving a first response to the first prompt to automatically populate the plurality of text fields, each of the plurality of text fields based on the user data and the recipient data;
     automatically determine, responsive to receiving a second response to the first prompt to not automatically populate the plurality of text fields and based on the user input and at least one of the user data and the recipient data, whether the user input includes an error;
     generate a flag indicating that the user input includes the error; and
     provide the flag to the user computing system;
     wherein the flag includes a second prompt to automatically correct the error.

5. The system of claim 3, wherein facilitating the financial transaction by the transaction circuit comprises:
   accessing a third hyperlink, the third hyperlink associated with a third webpage of the first financial institution, the third webpage comprising a plurality of text fields, each of the plurality of text fields structured to receive at least one the user data and the recipient data; and
   automatically populating each of the plurality of text fields with at least one of the user data and the recipient data.

6. The system of claim 2, wherein the executable is structured as at least one of a browser plug-in structured to be provided to the user browser of the user computing system and a mobile application.

7. The system of claim 2, wherein the e-mail circuit is further structured to:
retrieve e-mail data from an e-mail received by the e-mail circuit, the e-mail data comprising at least one of a hyperlink, a price, a coupon, transaction data, recipient data, and financial data from at least one of the plurality of financial institutions;
generate, based on the e-mail data, a financial profile of the user, the financial profile of the user including at least part of the e-mail data;
determine, based on the e-mail data, a status of the financial transaction, the status comprising at least one of when the financial transaction has been initiated, when the financial transaction is processing, when the financial transaction is cancelled, and when the financial transaction is completed;
generate a second notification indicating the status of the financial transaction; and
provide the second notification to the user computing system.

8. The system of claim 2, wherein the transaction circuit is further structured to retrieve financial institution data from at least one of the plurality of financial institutions, the financial institution data comprising a plurality of prices, each of the plurality of prices associated with one of the plurality of financial institutions; and
wherein the system comprises at least one of:
a screen scraping circuit structured to:
access the first hyperlink; and
retrieve a first portion of the plurality of prices, the first portion comprising webpage prices from the first webpage; and
an aggregator application programming interface (API) circuit structured to:
access a financial institution API; and
retrieve a second portion of the plurality of prices, the second portion comprising API prices from the financial institution API;
wherein the e-mail circuit is further structured to:
retrieve a third portion of the plurality of prices, the third portion comprising e-mail prices received via a first financial institution e-mail;
retrieve a coupon from a second financial institution e-mail; and
determine a fourth portion of the plurality of prices, the fourth portion comprising calculated prices determined by modifying at least one of the webpage prices, the API prices, and the e-mail prices with the coupon; and
wherein the transaction circuit is structured to:
determine, based on the financial institution data, a lowest price of the plurality of prices, the lowest price associated with at least one of the plurality of financial institutions.

9. The system of claim 2, wherein computer system structured is further structured to:
generate, by the account management circuit and responsive to determining that the first financial institution account does not exist, a first prompt comprising a request to create the first financial institution account;
provide, by the account management circuit, the first prompt to the user computing system via the executable;
receive, by the account management circuit, a first prompt response, the first prompt response comprising an indication to create the first financial institution account; and generate a third hyperlink, the third hyperlink associated with a third webpage of the first financial institution, the third webpage comprising a plurality of text fields, at least one of the plurality of text fields structured to receive at least one of a user email and a user password.

10. The system of claim 9, wherein the account management circuit comprises a zero-knowledge encryption circuit structured to:
automatically generate a first password associated with the first financial institution;
associate the first password with a first username;
retrievably store the first password and the first username in the user account vault;
access the third hyperlink; and
selectively provide the first password and the first username via the third webpage;
wherein the first password is not known to a service provider associated with the system.

11. The system of claim 10, wherein the account management circuit is further structured to:
provide the third hyperlink to the user computing system via the executable;
wherein the executable is further structured to automatically populate each of the plurality of text fields based on at least one of the first username and the first password.

12. The system of claim 10, wherein the account management circuit is further structured to:
access the third hyperlink;
automatically populate each of the plurality of text fields based on at least one of an e-mail address, the first username, and the first password;
receive, via the e-mail circuit, an account confirmation hyperlink; and
automatically access the account confirmation hyperlink to confirm the first financial institution account.

13. A method of facilitating financial transactions, the method comprising:
generating, by an account management circuit, a user account, the user account associated with a user and comprising user financial data, recipient financial data, and an e-mail address, the e-mail address associated with an e-mail circuit;
retrievably storing, by the account management circuit, the user account in a user account vault;
retrieving, by a transaction circuit, a plurality of prices, each of the plurality of prices associated with one of a plurality of financial institutions;
determining, by the transaction circuit, a lowest price of the plurality of prices, the lowest price associated with a first financial institution of the plurality of financial institutions;
receiving, from a user computing system, a first request to facilitate a financial transaction;
accessing, by the transaction circuit, a first hyperlink, the first hyperlink associated with a transaction webpage of the first financial institution;
determining, by the transaction circuit, whether a first financial institution account associated with the first financial institution and at least one of the e-mail circuit and the user exists in the user account vault;
accessing, by the account management circuit and responsive to determining that the first financial institution account exists, the first financial institution account;
automatically providing, by an executable, at least one of the user financial data and the recipient financial data on the transaction webpage;

facilitating, by the executable, the financial transaction via the transaction webpage;

receiving, by the e-mail circuit, a first email from the first financial institution comprising a transaction confirmation;

generating, by the transaction circuit, a notification comprising the transaction confirmation; and providing, by the transaction circuit, the notification to the user computing system.

14. The method of claim 13, wherein accessing the first hyperlink by at least one of the transaction circuit and the user computing system comprises:

determining, by the executable, whether a user browser is open on the user computing system;

determining, by the executable, whether the user browser is navigated to the first hyperlink;

intercepting, by the executable, a user input provided by the user to the user browser;

receiving, by the transaction circuit, the user input;

determining, by the transaction circuit, whether the user input comprises recipient data, the recipient data associated with a recipient of funds;

determining, by the transaction circuit and responsive to determining that the user input comprises the recipient data, whether the recipient data is stored in the user account vault; and retrievably storing, by the account management circuit and responsive to determining that the recipient data is not stored in the user account vault, the recipient data in the user account vault.

15. The method of claim 14, wherein the executable is at least one of a browser plug-in structured to be provided to the user browser of the user computing system and a mobile application structured to be installed on the user computing system.

16. The method of claim 14, further comprising:

automatically generating, by the account management circuit and responsive to determining that the first financial institution account does not exist, the first financial institution account, wherein automatically generating the first financial institution account comprises:

accessing, by the account management circuit, a second hyperlink, the second hyperlink comprising an account creation webpage associated with the first financial institution, the account creation webpage comprising at least one of an e-mail input field and a password input field;

automatically generating, by a zero-knowledge encryption circuit, a password;

automatically populating, by the executable, the e-mail input field with the e-mail address and the password input field with the password;

retrieving, by the e-mail circuit in real-time, a third hyperlink that, when accessed, is structured to provide an indication to the first financial institution that the first financial institution account is legitimate; and automatically accessing, by the account management circuit, the third hyperlink such that the first financial institution account is verified by the first financial institution.

17. The method of claim 13 further comprising:

automatically updating the plurality of prices based on at least one of:

webpage prices retrieved from a financial institution webpage utilizing a screen scraping circuit;

API prices retrieved from a financial institution application programming interface (API) utilizing an aggregator API circuit;

e-mail prices retrieved from a financial institution e-mail advertisement by the e-mail circuit; and calculated prices determined by modifying at least one of the webpage prices, the API prices, and the e-mail prices with a coupon retrieved from a financial institution e-mail by the e-mail circuit.

18. A non-transitory computer readable medium having computer-executable instructions embodied therein that, when executed by at least one processor of a computing system, cause the computing system to perform operations to facilitate a financial transaction, the operations comprising:

generating a user account, the user account comprising an e-mail address and user financial data;

retrieving a plurality of prices, each of the plurality of prices associated with one of a plurality of financial institutions;

determining a lowest price of the plurality of prices, the lowest price associated with a first financial institution of the plurality of financial institutions;

receiving a first request to facilitate the financial transaction at the first financial institution;

determining whether a user computing system has opened a web browser;

determining whether the web browser has accessed a first hyperlink, the first hyperlink associated with a first webpage;

intercepting a user input provided by a user to the first webpage, the user input comprising recipient data;

associating the recipient data with the user account;

determining whether a financial institution account that is associated with the user and the first financial institution exists;

accessing the financial institution account responsive to determining that the financial institution account exists;

automatically providing at least one of the user financial data and the recipient data to the first webpage;

facilitating the financial transaction via the first webpage;

receiving a first email from the first financial institution comprising a transaction confirmation;

generating a notification comprising the transaction confirmation; and providing the notification to the user computing system.

19. The non-transitory computer readable medium of claim 18, wherein the non-transitory computer readable medium comprises at least one of:

a web browser extension structured to be provided to the web browser of the user computing system; and an application structured to be installed on the user computing system.

20. The non-transitory computer readable medium of claim 18, wherein the operations further comprise at least one of:

an automatic repeated transaction operation structured to facilitate executing multiple transactions repeatedly, the automatic repeated transaction operation comprising:

facilitating a plurality of financial transactions;

retrievably storing data associated with each of the plurality of financial transactions, the data comprising at least one of a transaction amount, the recipient data, and the user financial data;

generating a prompt comprising a second request for automatic repeated transactions;

providing the prompt to the user computing system;
receiving a response indicating that the user wants the automatic repeated transactions; and
automatically facilitating the automatic repeated transactions responsive to receiving the response; and
an automatic financial institution account generation operation structured to automatically generate the financial institution account responsive to determining that the financial institution account does not exist, the automatic financial institution account generation operation comprising:
accessing an account creation webpage associated with the first financial institution, the account creation webpage comprising at least an e-mail input field and a password input field;
automatically generating a password utilizing a zero-knowledge encryption circuit;
automatically populating the e-mail input field with the e-mail address and the password input field with the password;
retrieving in real-time an account verification hyperlink that, when accessed, is structured to provide an indication to the first financial institution that the financial institution account is legitimate; and
automatically accessing the account verification hyperlink such that the financial institution account is verified by the first financial institution.

\* \* \* \* \*